United States Patent [19]

Kato

[11] Patent Number: 4,831,444

[45] Date of Patent: May 16, 1989

[54] VIDEO CAMERA DEVICE WITH SEPARATE CAMERA HEAD AND SIGNAL PROCESSING CIRCUIT

[75] Inventor: Shinichi Kato, Tokyo, Japan

[73] Assignee: Olympus Optical Co., Ltd., Japan

[21] Appl. No.: 117,081

[22] Filed: Nov. 5, 1987

[30] Foreign Application Priority Data

| Nov. 6, 1986 | [JP] | Japan | 61-264407 |
| Nov. 6, 1986 | [JP] | Japan | 61-264408 |
| Nov. 6, 1986 | [JP] | Japan | 61-264409 |
| Feb. 3, 1987 | [JP] | Japan | 62-23107 |
| Feb. 3, 1987 | [JP] | Japan | 62-23108 |
| Feb. 3, 1987 | [JP] | Japan | 62-23109 |

[51] Int. Cl.⁴ .................. H04N 5/14; H04N 7/18; H04N 5/04
[52] U.S. Cl. .................. 358/160; 358/98; 358/148
[58] Field of Search .......... 358/98, 148, 149, 158, 358/160, 213.26

[56] References Cited

U.S. PATENT DOCUMENTS

| 3,429,994 | 2/1969 | Pay et al. | 358/149 |
| 3,655,913 | 4/1972 | Schneider | 358/149 |
| 3,761,627 | 9/1973 | Schneider | 358/149 |
| 4,164,757 | 8/1979 | Smiley | 358/149 |
| 4,539,586 | 9/1985 | Danna et al. | 358/98 |
| 4,706,118 | 11/1987 | Kato et al. | 358/98 |
| 4,746,975 | 5/1988 | Ogiu | 358/98 |

FOREIGN PATENT DOCUMENTS 0218226 4/1987 European Pat. Off. .
2543113 11/1978 Fed. Rep. of Germany .

Primary Examiner—James J. Groody
Assistant Examiner—Michael D. Parker

[57] ABSTRACT

A video camera device in which camera head and signal processing circuit are provided separately and connected to each other by cable. Camera head includes CCD, drive pulse generator for generating a drive pulse of CCD, and first VCO for generating a clock pulse. Drive pulse generator frequency divides the clock pulse signal from first VCO to produce the drive pulse. Signal processing circuit includes signal processor for processing, e.g., clamping and sampling/holding a signal from CCD, timing generator for generating a timing signal of the signal processor, and a second VCO for generating a clock pulse. Timing generator frequency divides the clock pulse signal from second VCO to generate the timing signal. The output of first VCO is supplied from camera held through cable to signal processing circuit, and to phase comparator. The output of second VCO is also supplied to phase comparator. The oscillation frequency of second VCO is controlled by the output of phase comparator such that the phase difference detected by phase comparator is made zero.

35 Claims, 17 Drawing Sheets

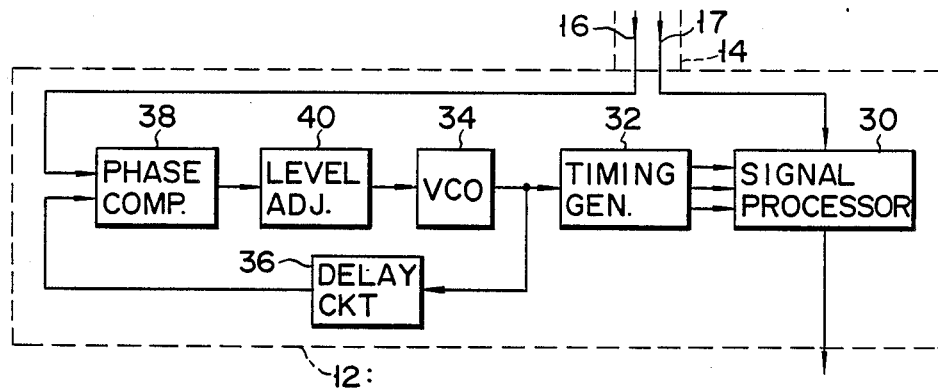
F I G. 2A
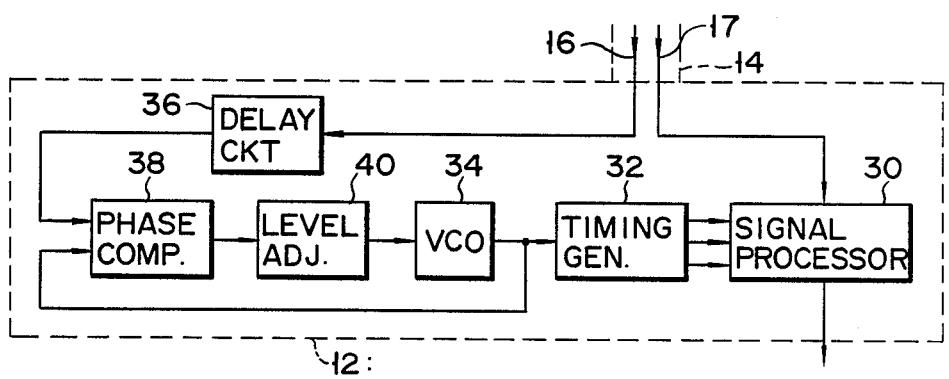
F I G. 2B
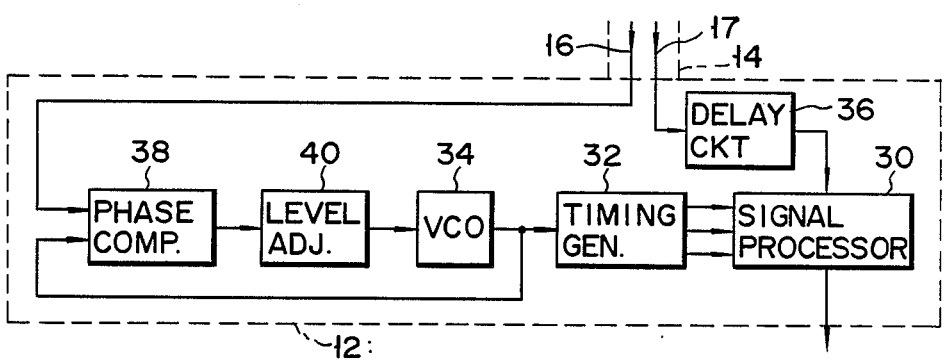
F I G. 2C

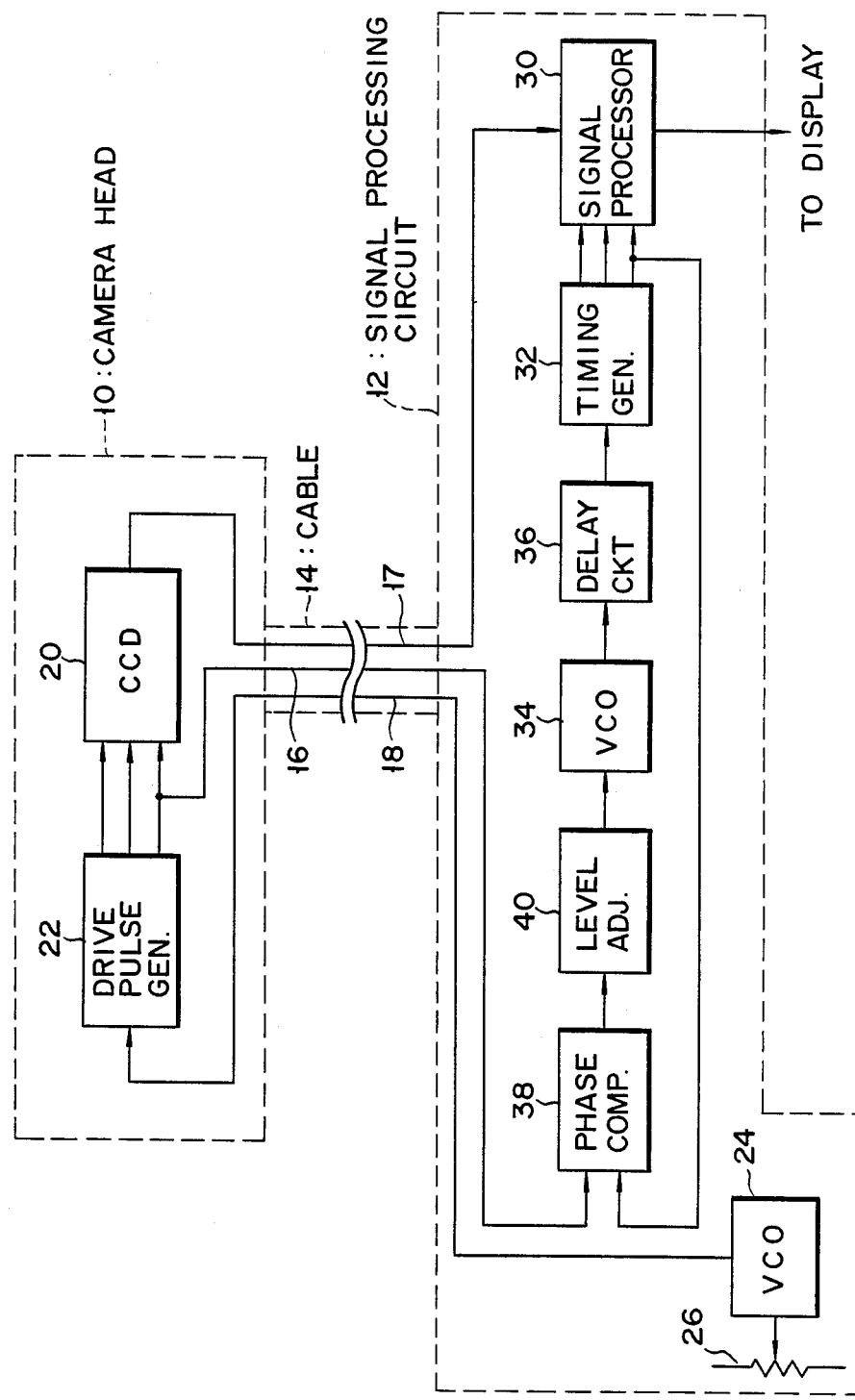
F I G. 3

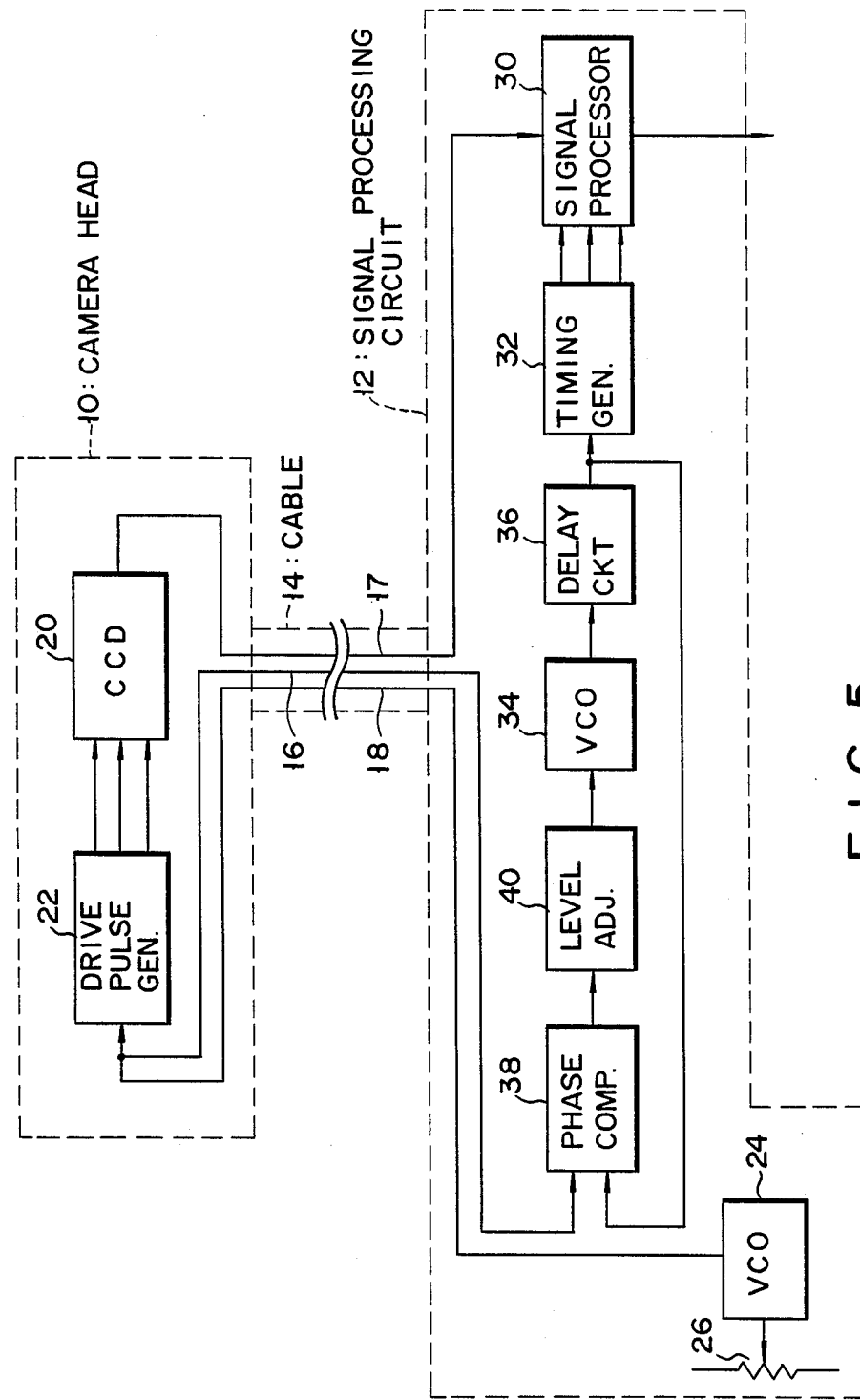
F I G. 5

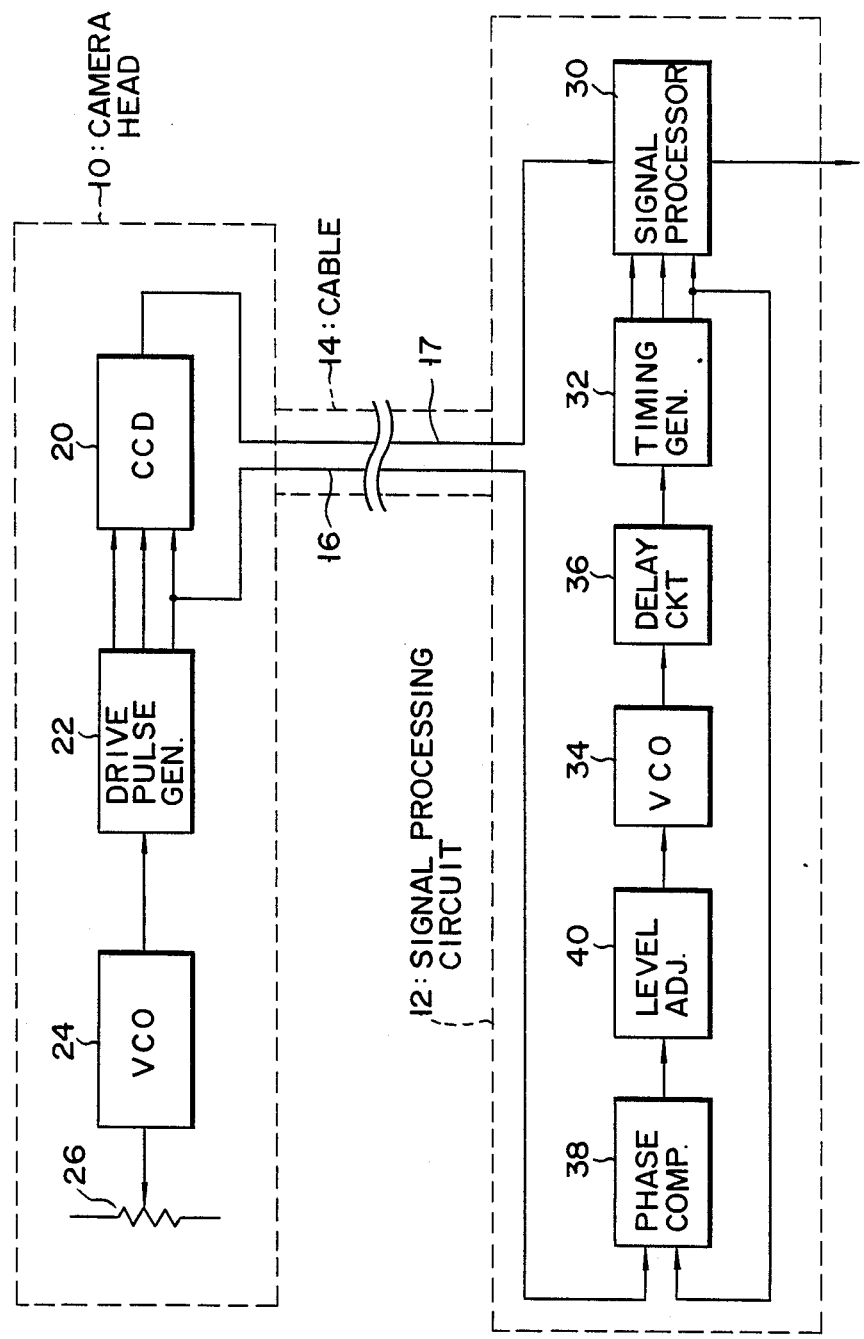
F I G. 7

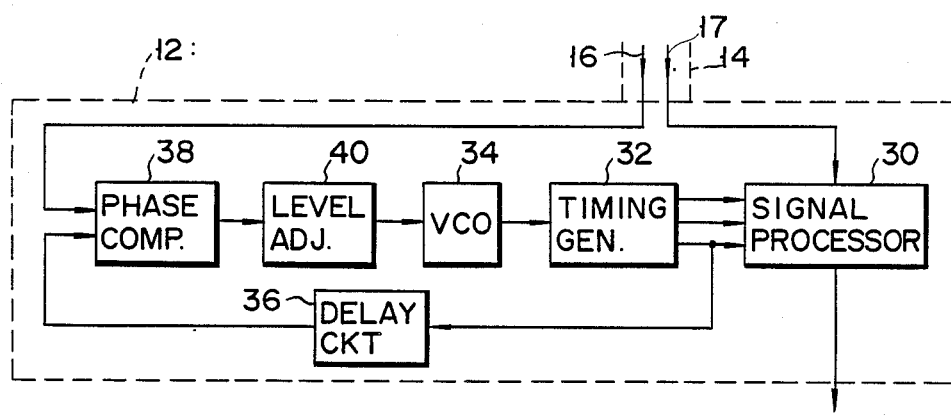
F I G. 8A
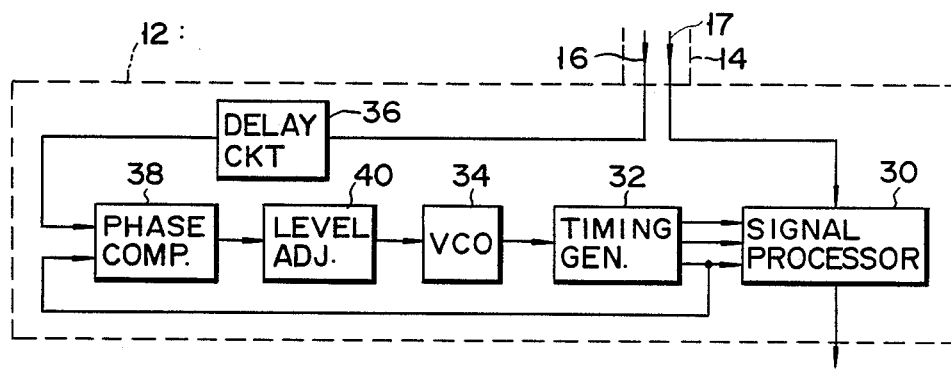
F I G. 8B
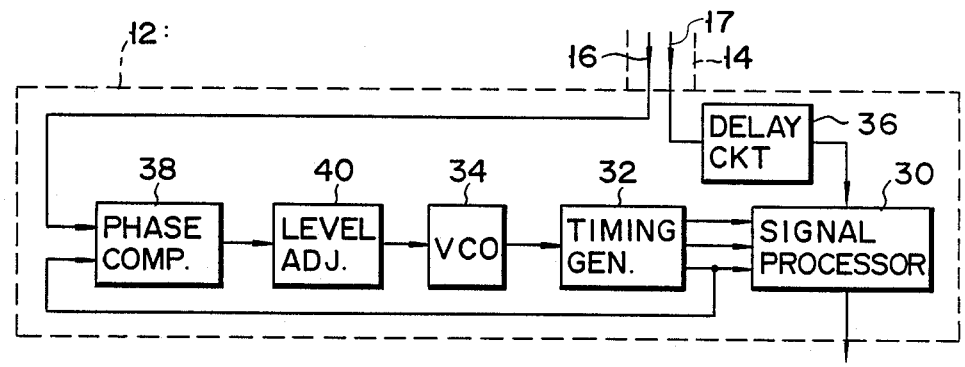
F I G. 8C

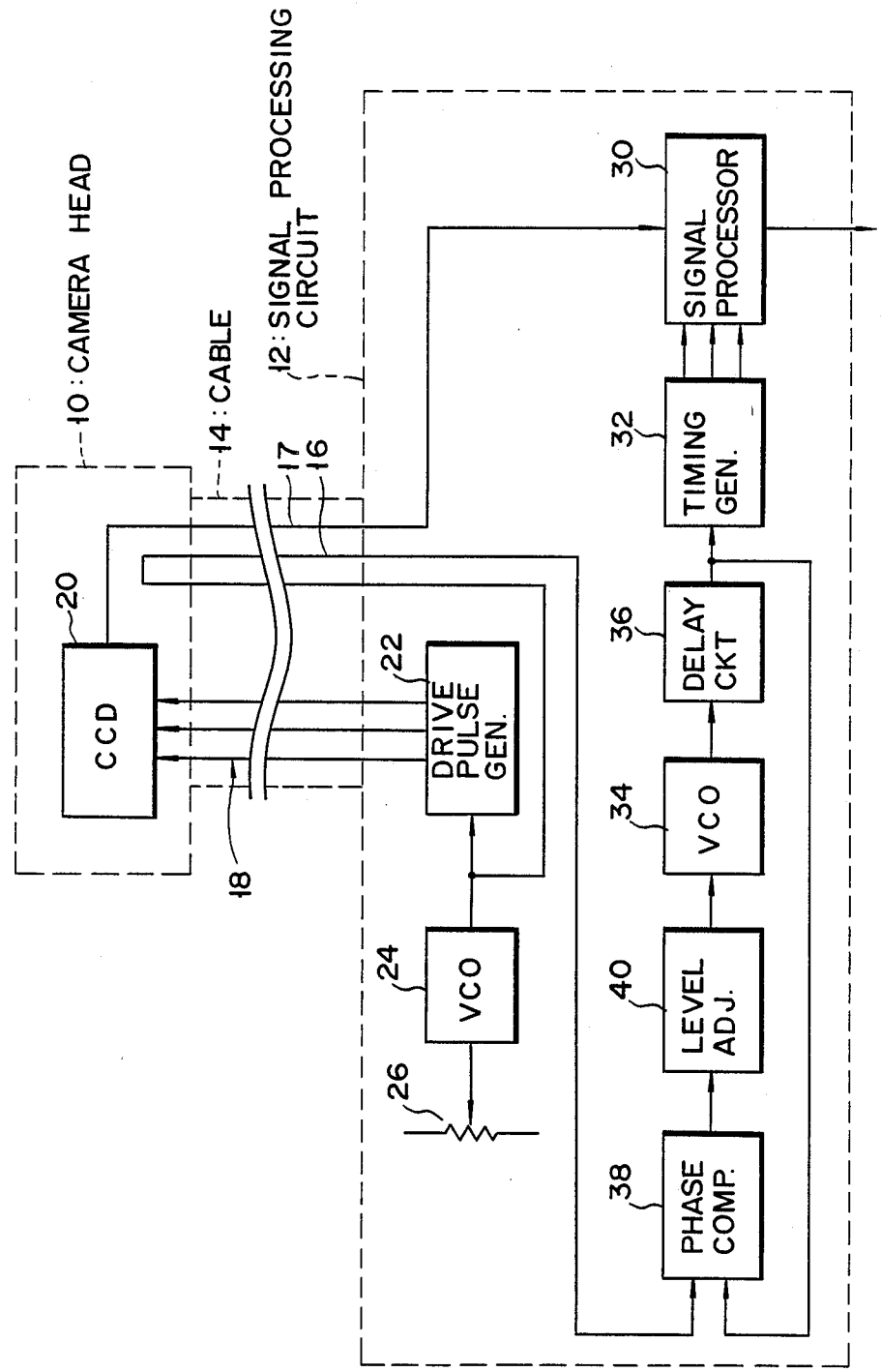
F I G. 9

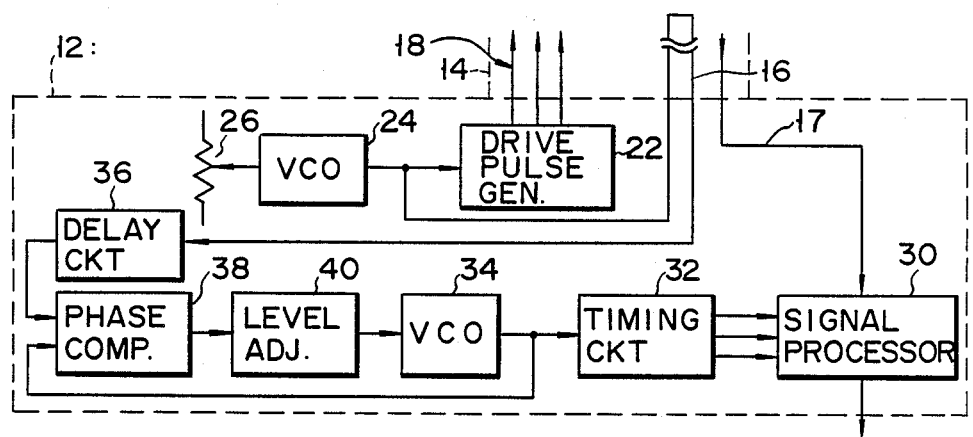
F I G. 10A
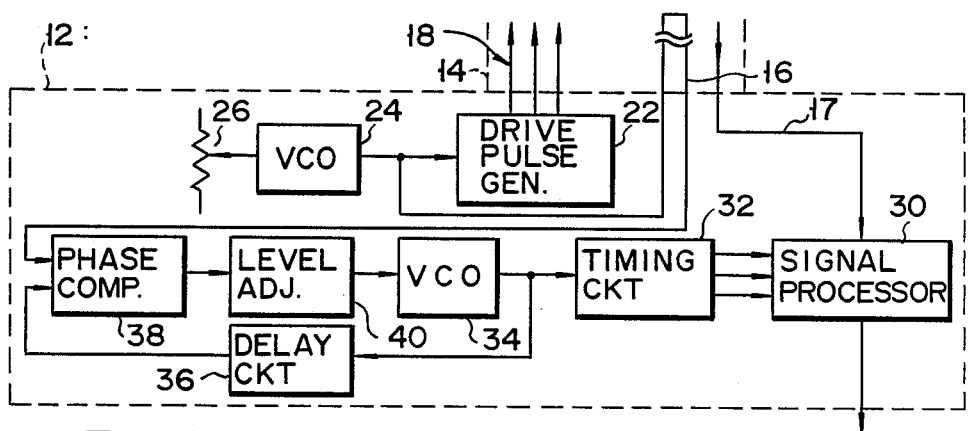
F I G. 10B
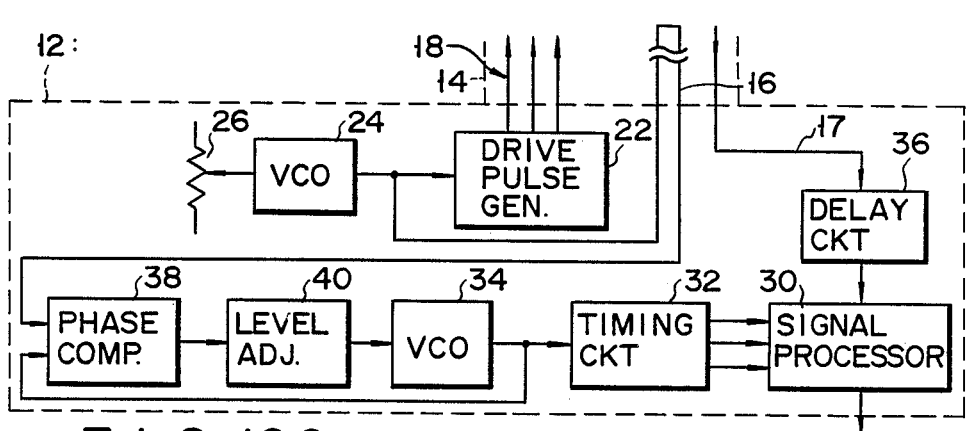
F I G. 10C

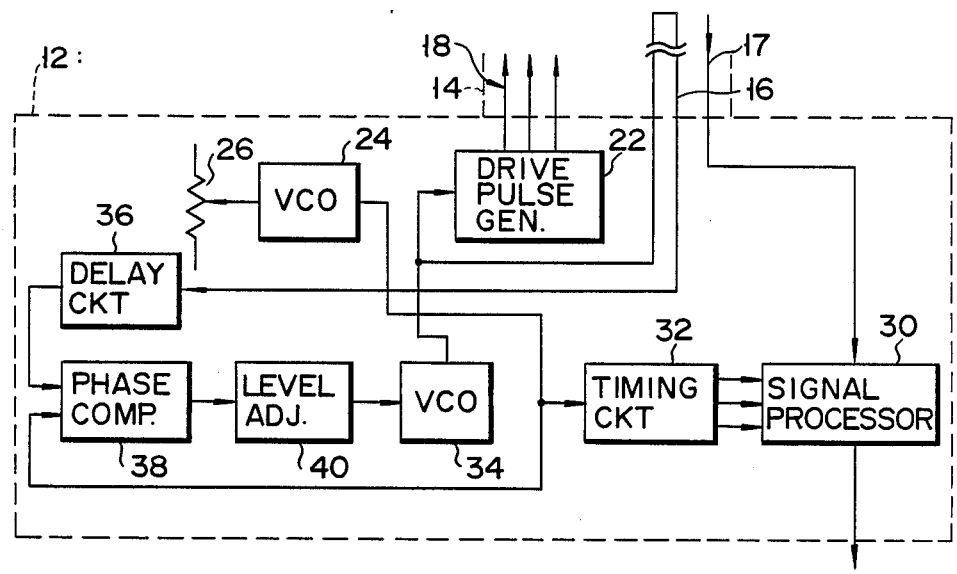
F I G. 12A
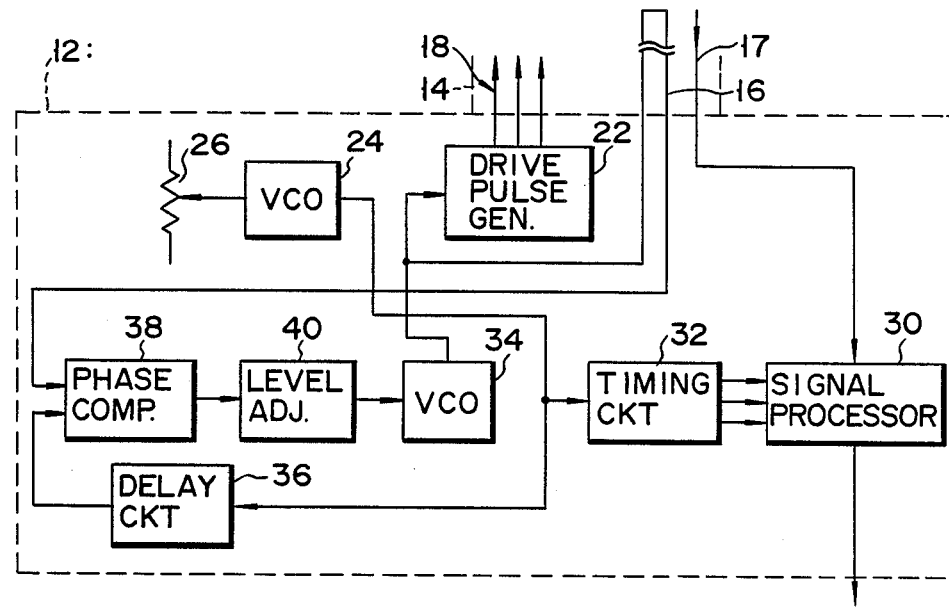
F I G. 12B

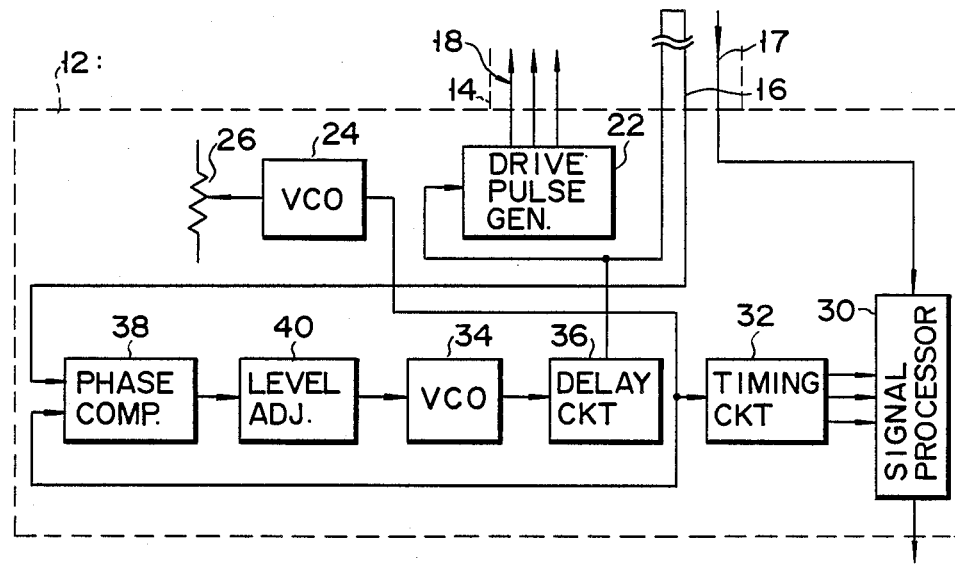
F I G. 12C
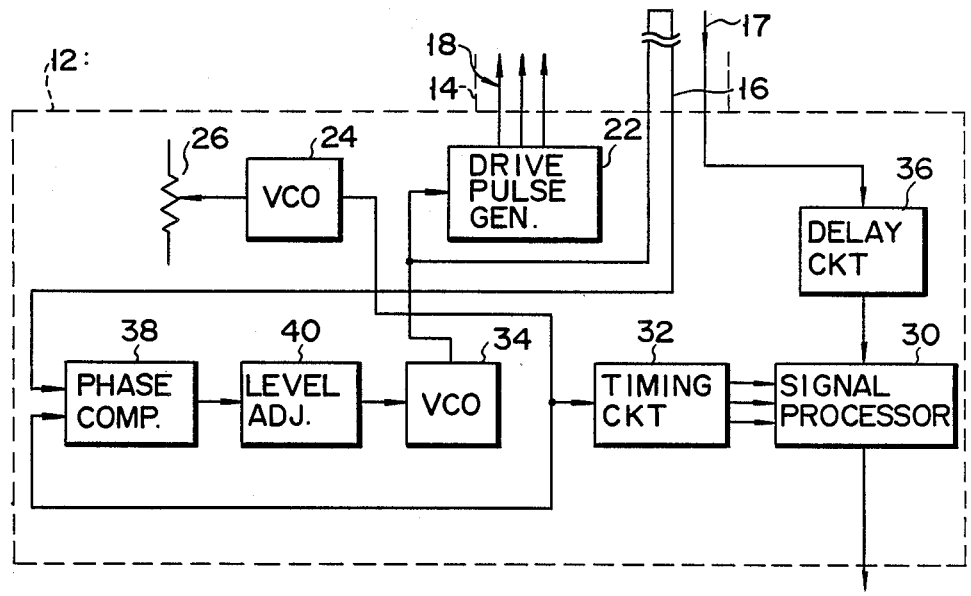
F I G. 12D

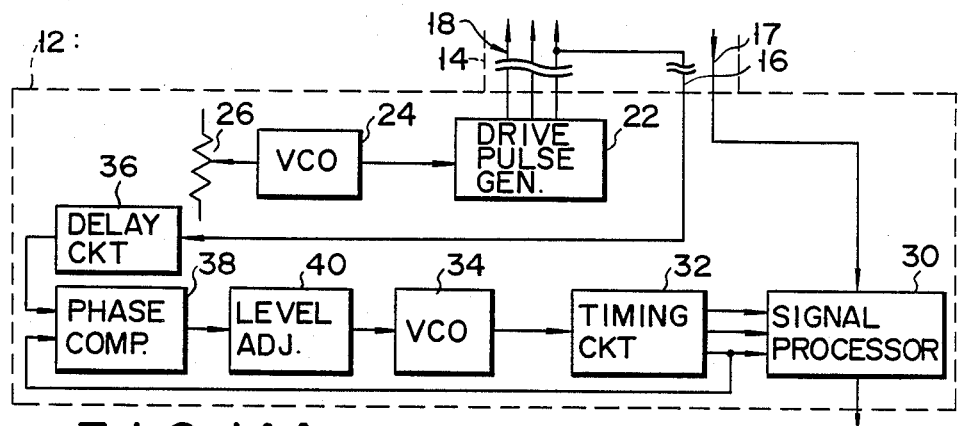
F I G. 14A
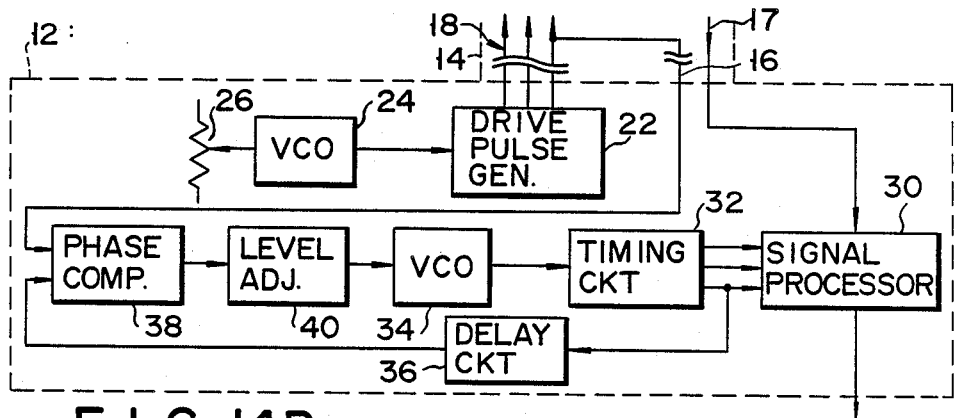
F I G. 14B
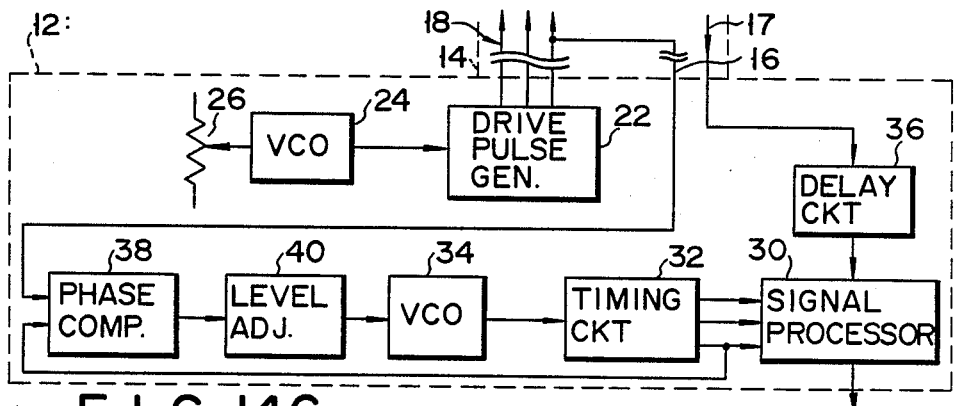
F I G. 14C

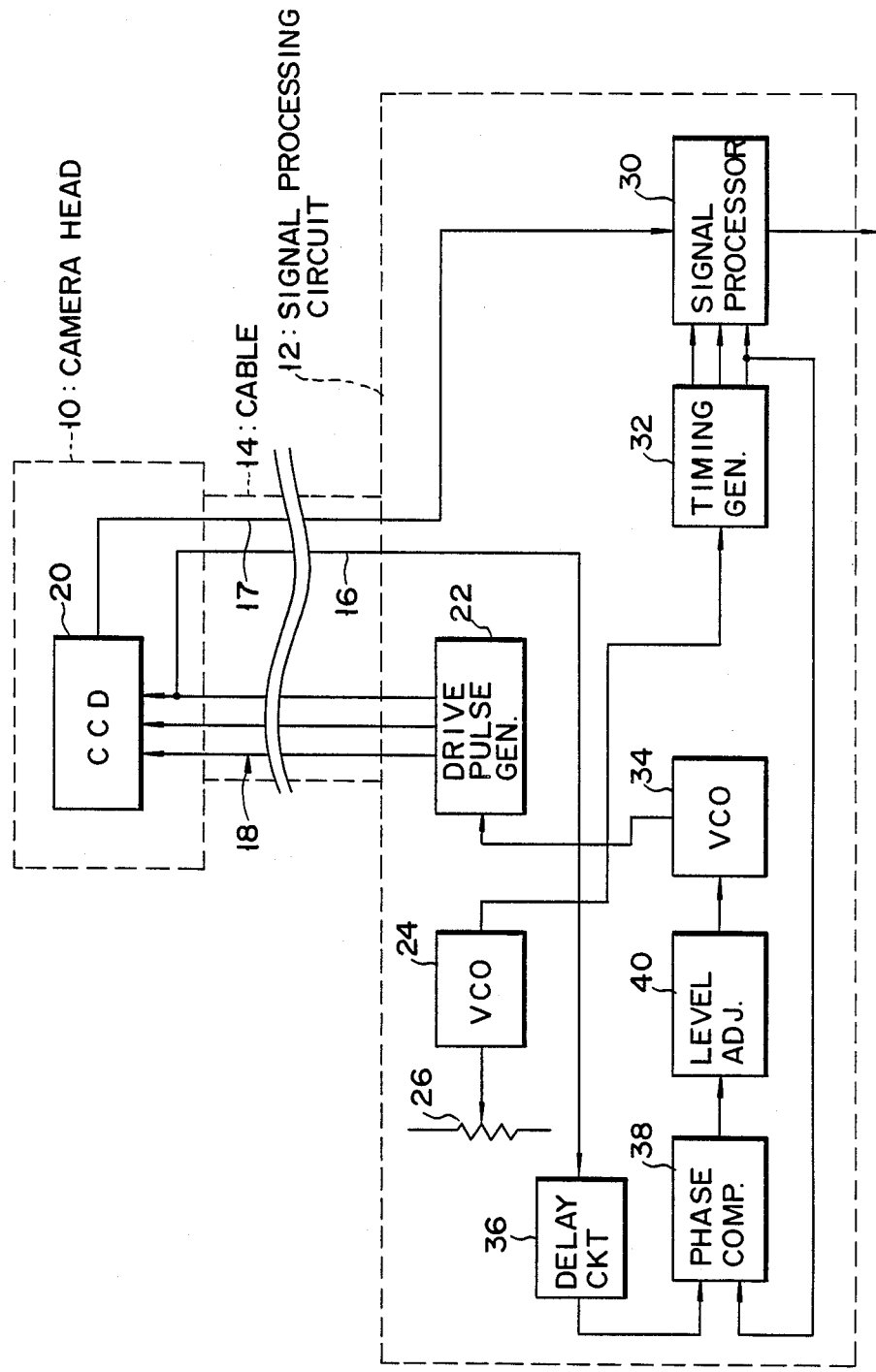
F I G. 15

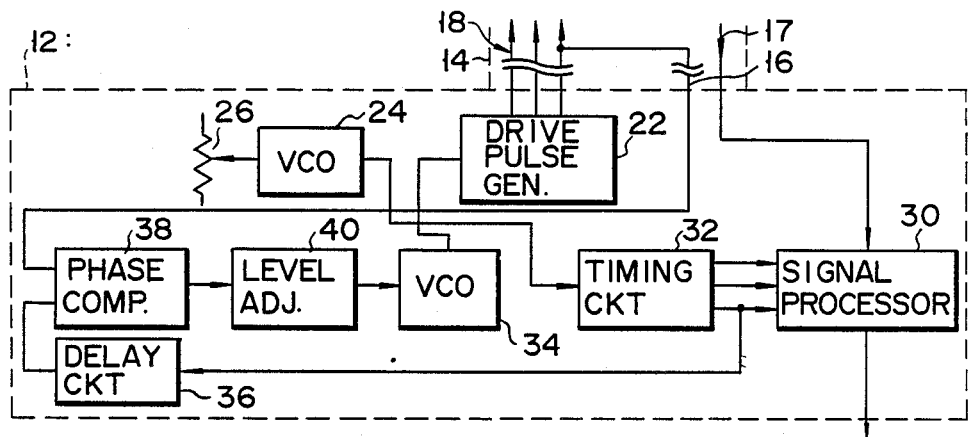
F I G. 16A
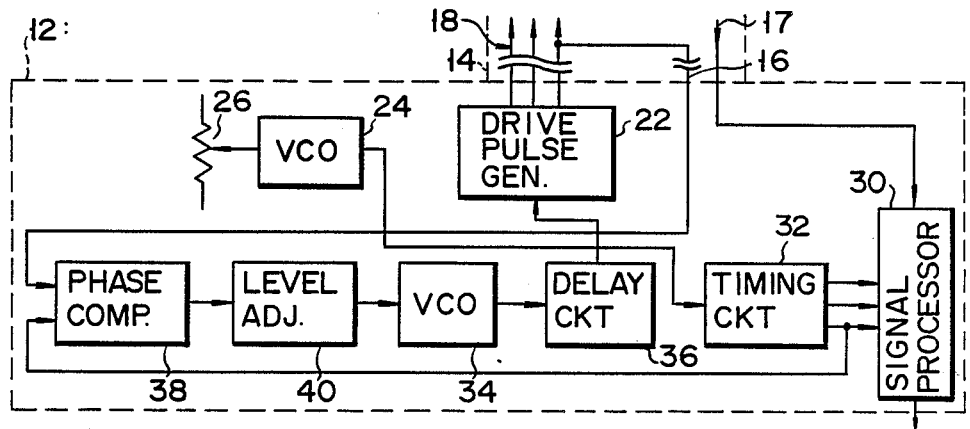
F I G. 16B
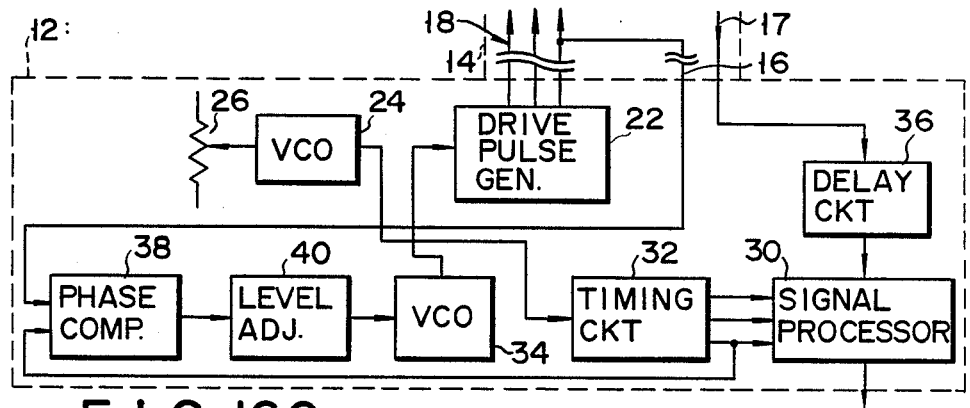
F I G. 16C

VIDEO CAMERA DEVICE WITH SEPARATE CAMERA HEAD AND SIGNAL PROCESSING CIRCUIT

BACKGROUND OF THE INVENTION

This invention relates to a video camera device, in which a camera head and a signal processing unit are provided as separate components and connected to each other by a signal line.

As such a video camera device, there is an endoscope device which is disclosed in United States patent application Ser. No. 914,168, filed Oct. 1, 1986. The device comprises a solid-state image sensor device, e.g., a charge-coupled device (CCD) for picking up an image of an object. The CCD is provided at a distal end of an endoscope as a camera head. For size reduction of the distal end of the endoscope, a signal processing unit for processing the output of the CCD is provided separately from the endoscope. Usually, it is provided in a light source unit. A drive pulse signal for driving the CCD is transmitted from a drive pulse generator provided in the signal processing unit to the CCD through a signal line included in a cable connecting the endoscope and light source unit. An output of the CCD is transmitted through the signal line from the endoscope to the signal processing unit, undergoes such processing as clamping and sampling/holding, and is changed into an image signal of the object.

The drive pulse signal is a high frequency pulse signal. Therefore, if it is transmitted through a long signal line, its waveform is distorted during transmission. In this case, when it is supplied to the CCD, it is no longer a pulse wave, so that the CCD can not be driven with accurate timing. For this reason, a matching circuit for compensating for the waveform distortion should be provided in the signal processing unit for supplying the drive pulse signal to the CCD through the matching circuit.

The output of the CCD also is delayed while it is transmitted to the signal processing unit, and when it enters the signal processing unit, it is delayed with respect to the timing of the drive pulse signal. Therefore, the signal processing unit can not clamp or sample/hold the transmitted signal at a proper timing. In order to compensate for this, various timings of the signal processing are delayed with respect to the timing of the drive pulse signal in accordance with the kind of the endoscope (i.e., the length of the signal line).

Generally, the cable is integral with the endoscope and the length of the endoscope varies with the kind thereof (i.e., the object to be examined). Therefore, the length of the signal line between the CCD and the signal processing circuit is varies in accordance with the kind of the endoscope. In order to commonly connect a plurality of endoscopes to a common signal processing unit (light source unit), therefore, it is necessary to provide the signal processing unit with timing matching circuits corresponding in number to the number of endoscopes of different kinds but commonly connected to the signal processing unit. This means that the size of the signal processing unit is increased with increase of the number of timing matching circuits. Further, since the amplitude of the drive pulse signal is considerably large and the high frequency drive pulse signal has many higher harmonic wave components, the influence of electromagnetic wave, which is radiated from the signal line as the drive pulse is transmitted from the signal processing unit to the CCD, can not be ignored.

SUMMARY OF THE INVENTION

An object of the invention is to provide a video camera device comprising a camera head and a signal processing unit as respective separate components and connected to each other by a signal line, with which adverse effects of delay and waveform deterioration of signal during transmission through the signal line, are compensated for irrespective of variations of the length of the signal line and with a simple construction.

To attain the above object of the invention, there is provided a video camera device, in which a camera head with an image sensor section and a signal processing unit for processing a signal from the image sensor section are provided as separate components and are detachably connected to each other via a signal line, and which comprises a phase detector for detecting a phase deviation between a signal concerning the drive timing of the image sensor section, supplied from the camera head through the signal line, and a signal concerning the timing of signal processing in the signal processing unit, thereby detecting the phase deviation between the camera head and signal processing unit due to delay of signal during transmission thereof on the signal line, and a phase controller for controlling at least one of the drive timing of the image sensor section and the timing of signal processing in the signal processing unit according to the output of the phase detector to make these two timings coincident.

BRIEF DESCRIPTION OF THE DRAWINGS

FIGS. 2A, 2B, and 2C are block diagrams showing modifications of the first embodiment;

FIG. 3 is a block diagram showing a second embodiment of the video camera device according to the invention;

FIG. 5 is a block diagram showing a third embodiment of the video camera device according to the invention;

FIG. 7 is a block diagram showing a fourth embodiment of the video camera device according to the invention;

FIGS. 8A, 8B, and 8C are block diagrams showing modifications of the fourth embodiment;

FIG. 9 is a block diagram showing a fifth embodiment of the video camera device according to the invention;

FIGS. 10A, 10B, and 10C are block diagrams showing modifications of the fifth embodiment;

FIGS. 12A, 12B, 12C, and 12D are block diagrams showing modifications of the sixth embodiment;

FIGS. 14A, 14B, and 14C are block diagrams showing modifications of the seventh embodiment;

FIG. 15 is a block diagram showing an eighth embodiment of the video camera device according to the invention; and FIGS. 16A, 16B, and 16C are block diagrams showing modifications of the eighth embodiment.

DETAILED DESCRIPTION OF THE PREFERRED EMBODIMENTS

Figure 1:
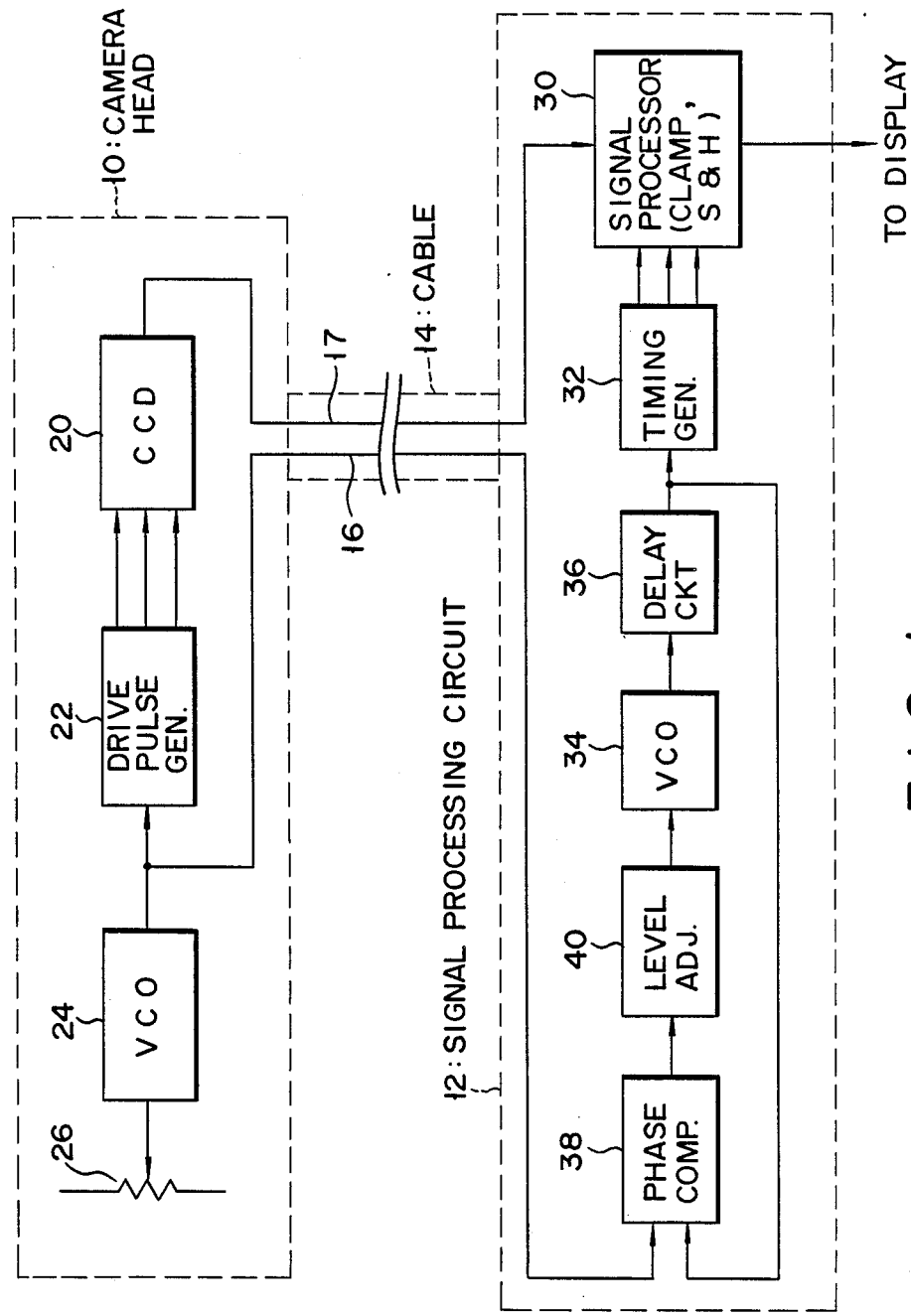
FIG. 1 is a block diagram showing a first embodiment of the video camera device according to the invention.

Now, preferred embodiments of the video camera device according to the invention will be described with reference to the accompanying drawings. FIG. 1 is a block diagram showing a first embodiment of the invention. The first embodiment of the video camera device comprises camera head 10 and signal processing circuit 12. Camera head 10 and signal processing circuit 12 are connected to each other by cable 14. Cable 14 may be integral with or separate from camera head 10, and its length is subject to variation and may sometimes be several meters.

Camera head 10 includes solid-state image sensor device 20 (which is a CCD (charge-coupled device) here), drive pulse generator 22 for generating a drive pulse signal for CCD 20, first voltage controlled oscillator (VCO) 24 for generating a clock pulse signal giving a reference timing of drive pulse generator 22, and potentiometer 26 for generating a control voltage for determining the oscillation frequency of first VCO 24. Drive pulse generator 22 includes a frequency divider for frequency dividing the pulse signal output of first VCO 24. The output of first VCO 24 is supplied through signal line 16 in cable 14 to signal processing circuit 12.

Signal processing circuit 12 includes signal processor 30 for performing signal processing, e.g., clamping and sampling/holding, on the output signal of CCD 20 supplied from camera head 10 through signal line 17 in cable 14, timing generator 32 for generating various timing pulse signals determining a clamping timing and a sampling/holding timing of signal processor 30, second VCO 34 for generating a clock pulse signal giving a reference timing of timing generator 32, delay circuit 36 for delaying the output of second VCO 34 and supplying the delayed output to timing generator 32, phase comparator 38 for detecting the phase difference between the output of delay circuit 36 and output of first VCO 24 which is transmitted from camera head 10 through signal line 16 to signal processing circuit 12, and level adjuster 40 for supplying a control voltage corresponding to the output of phase comparator 38 to second VCO 34. The output of signal processor 30 is supplied to a display (not shown). Timing pulse generator 32 includes a frequency divider for frequency dividing the pulse signal output of second VCO 34. Level adjuster 40 has an operational amplifier for converting the output of phase comparator 38 into the control voltage for second VCO 34 and a low-pass filter.

In this first embodiment, the oscillation frequencies of first and second VCOs 24 and 34 are made coincident by finely adjusting the control voltage applied to first VCO 24 with potentiometer 26. The phases of first and second VCOs 24 and 34 are made coincident through the feedback control by phase comparator 38. The drive pulse signal generated from drive pulse generator 22 according to the output of first VCO 24 (through frequency division) is supplied to CCD 20. As a result, CCD 20 is driven to start picking-up an image.

CCD 20 provides a discontinuous pixel image signal for each pixel. The pixel image signal is supplied to signal processor 30 for signal processing, e.g., clamping and sampling/holding. Thus, a continuous image signal of the object is obtained. Timing pulse signals for determining the timings of the various signal processings noted above, are generated from timing generator 32 according to the output of second VCO 34 (through frequency division). Since the oscillation frequencies and phases of first and second VCOs 24 and 34 are coincident, the timing of driving of CCD 20 is coincident with various timings of signal processor 30. However, since camera head 10 and signal processing circuit 12 are connected to each other by cable 14, the output of CCD 20, which is supplied to signal processor 30 through a signal line 17, is delayed with respect to the phase of the drive pulse signal. For this reason, the various timings of signal processor 30 will be deviated from the timing of the output of CCD 20 unless some phase control means is used.

In the first embodiment, the output of first VCO 24 in camera head 10, which gives a reference of drive timing of CCD 20, is transmitted through signal line 16 of cable 14 to signal processing circuit 12. The phase difference between this signal (output of first VCO 24) and the output of second VCO 34 in signal processing circuit 12, which gives a reference of timing of signal processing in signal processor 30, is detected by phase comparator 38. It is now assumed that the length of signal line 16 from output terminal of first VCO 24 to the input terminal of phase comparator 38, is equal to the length of signal line 17 from the output terminal of CCD 20 to the input terminal of signal processor 30. In this case, ignoring the delay of signal from phase comparator 38 to timing generator 32, a phase delay produced until the output of CCD 20 is transmitted to signal processor 30 is detected by phase comparator 38. Second VCO 34 forms a phase-locked loop (PLL) circuit together with delay circuit 36 and phase comparator 38. Delay circuit 36 serves to match phase as much as possible when a too great phase difference to be matched by VCO 34 is produced. It may be omitted if VCO 34 has sufficient phase-matching function. By this PLL circuit, signals supplied to two input terminals of phase comparator 38 are made coincident in phase and frequency.

For this reason, the outputs of timing generator 32 and CCD 20 are made coincident in phase when they are supplied to signal processor 30, and the output of CCD 20 is subjected to signal processing at accurate timing. Further, in the case of the endoscope noted above, even if the delay time in the transmission of signal is varied with a variation of the length of cable 14, the same simple arrangement of PLL circuit may be used in signal processing circuit 12, and unlike the prior art there is no need of providing or adjusting a compensation circuit for each cable length.

Further, since in the first embodiment drive pulse generator 22 is provided in camera head 10, there is no need of transmitting drive pulse signal from signal processing circuit 12 through cable 14. Therefore, no matching circuit for pre-compensating for waveform distortions need be provided in signal processing circuit 12. Furthermore, there is no need of considering the influence of electromagnetic waves radiated from drive pulse signal being transmitted.

The position of connection of delay circuit 36 is not limited to the output side of VCO 34, and it is possible to select various other positions. FIGS. 2A to 2C show modifications of the first embodiment with respect to connection of delay circuit 36. In the modification of FIG. 2A, the output of VCO 34 is directly supplied to timing generator 32, and delay circuit 36 is inserted in a feedback line between the output terminal of VCO 34 and phase comparator 38. In the modification of FIG. 2B, the output of VCO 24, which is supplied from camera head 10 through signal line 16, is supplied through delay circuit 36 to phase comparator 38. In the modification of FIG. 2C, the output of CCD 20, which is supplied from camera head 10 through signal line 17, is supplied through delay circuit 36 to signal processor 30. With any of the above modifications, the same effects as with the first embodiment can be obtained.

Now, other embodiments of the video camera device according to the invention will be described. In the other embodiments, elements like those in the first embodiment are designated by same reference numerals. The other embodiments basically comprises the same elements as in the first embodiment but are slightly different from the first embodiment in the circuit connections.

FIG. 3 is a block diagram showing a second embodiment. First VCO 24 is provided not in camera head 10 but in signal processing circuit 12. The output of VCO 24 is supplied through signal line 18 in cable 14 to drive pulse generator 22 in camera head 10. Phase comparator 38 detects the phase difference between equal frequency signals of drive pulse signals and timing pulse signals obtained through frequency division of the outputs of VCOs 24 and 34 instead of the phase difference between the output of VCO 24 and input to timing generator 32. More specifically, the output of drive pulse generator 22 having a predetermined frequency is transmitted through signal line 16 to a first input terminal of phase comparator 38. The output of timing generator 32 having the same predetermined frequency is supplied to a second input terminal of phase comparator 38.

In this second embodiment, the timing pulse signal output from timing generator 32 coincides in phase with the output of CCD 20 having been transmitted from camera head 10 through signal line 17 to signal processor 30 with a slight delay. Therefore, the output signal of CCD 20 is subjected to signal processing at accurate timing. Further, in this embodiment a drive pulse signal after frequency division is transmitted instead of the output of VCO 24 from camera head 10 to signal processing circuit 12, so that it is possible to obtain phase coincidence after frequency division. Further, the drive pulse signal is lower in frequency than the output of VCO 24, so that waveform deterioration during transmission is less liable.

Figure 4A:
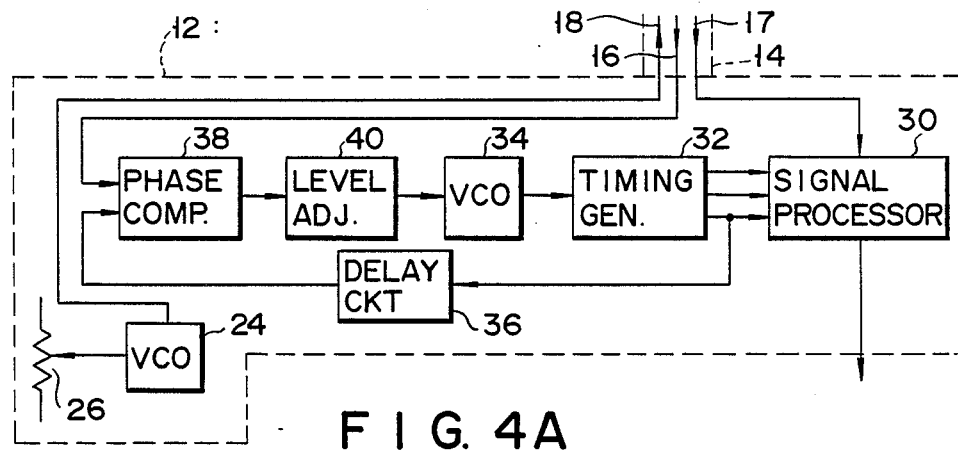
FIGS. 4A, 4B, and 4C are block diagrams showing modifications of the second embodiment.
Figure 4B:
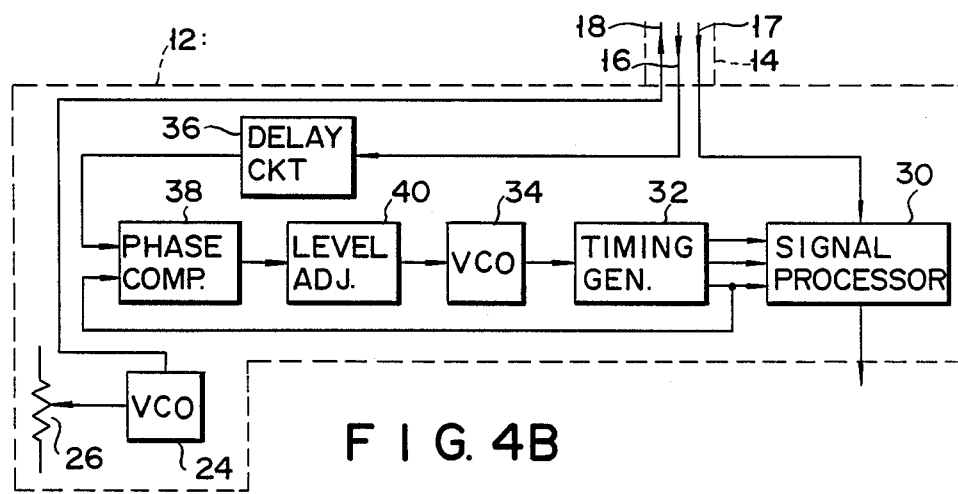
Figure 4C:
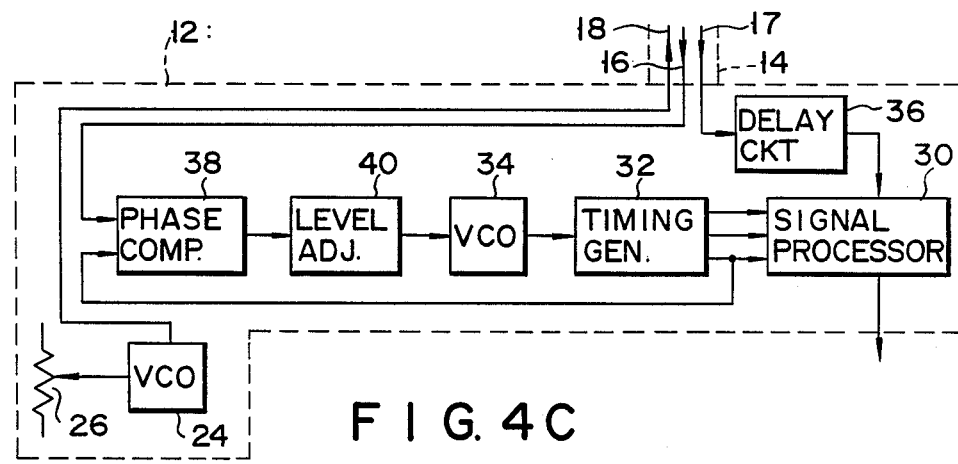

FIGS. 4A to 4C show modifications of the second embodiment concerning the position of connection of delay circuit 36. In the modification of FIG. 4A, the output of timing generator 32 is supplied through delay circuit 36 to phase comparator 38. In the modification of FIG. 4B, the output of drive pulse generator 22, supplied from camera head 10 through signal line 16, is supplied through delay circuit 36 to phase comparator 38. In the modification of FIG. 4C, the output of CCD 20, supplied through signal line 17, is supplied through delay circuit 36 to signal processor 30. With these modifications, it is possible to obtain the same effects as in the second embodiment.

As has been shown, in the first and second embodiments the delay in the transmission of signal from the camera head to the signal processing circuit is detected by the phase comparator in the signal processing circuit, and the timing of the signal processing circuit for processing the output of the solid-state image sensor device is controlled by the output of the phase comparator. Thus, it is possible to provide a video camera device with the separate camera head and signal processing circuit having a simple construction, which can compensate for the delay of phase during the transmission of the signal along the cable between the camera head and signal processor. Further, with the video camera device the drive pulse signal of the solid-state image sensor device is not transmitted from the signal processing circuit but is generated in the camera head. Therefore, there is no need of providing the signal processing circuit with any matching circuit for pre-compensating for the deterioration of the waveform during transmission of the drive pulse signal, and the construction of the signal processing circuit is simplified.

FIG. 5 is a block diagram showing a third embodiment. In this embodiment, camera head 10 comprises CCD 20 and drive pulse generator 22. First VCO 24 (as well as potentiometer 26) for providing a reference timing of generator 22 is provided in signal processing circuit 12. The output of VCO 24 is supplied through signal line 18 in cable 14 to drive pulse generator 22. The output of VCO 24 which has been supplied to generator 22 is returned through signal line 16 to phase comparator 38 in signal processing circuit 12. The output of second VCO 34 is supplied through delay circuit 36 to the other input terminal of comparator 38.

In the third embodiment, the input to drive pulse generator 22 in camera head 10 (i.e., the output of first VCO 24 in signal processing circuit 12, supplied to camera head 10 through signal line 18) is returned through signal line 16 to signal processing circuit 12, and the phase difference between this returned signal and the output of second VCO 24 is detected in phase comparator 38. If the length of signal line 16 from the input terminal of drive pulse generator 22 to the input terminal of phase comparator 38 is made equal to the length of signal line 17 from the output terminal of CCD 20 to the input terminal of signal processor 30, the phase delay until the output of CCD 20 is transmitted to signal processing circuit 30 is detected by phase comparator 38.

Therefore, the timing pulse signal of signal processor 30 coincides in phase with the output signal of CCD 20 having been transmitted from camera head 10 through cable 14 to signal processor 30, and the output signal of CCD 20 is processed at accurate timing. Further, in the case of the endoscope noted above, even if the delay time in the signal transmission is changed with a change in the length of cable 14, the same arrangement of PLL circuit may be used in signal processing circuit 12, and the adjustment is unnecessary.

Further, in the third embodiment, drive pulse generator 22 is provided in camera head 10, so that there is no need of transmitting any drive pulse signal through cable 14. Therefore, there is no need of providing signal processor 12 in any matching circuit for preliminarily compensating for the waveform distortion. Further, there is no need of considering the influence of electromagnetic waves radiated by the drive pulse signal being transmitted.

Figure 6A:
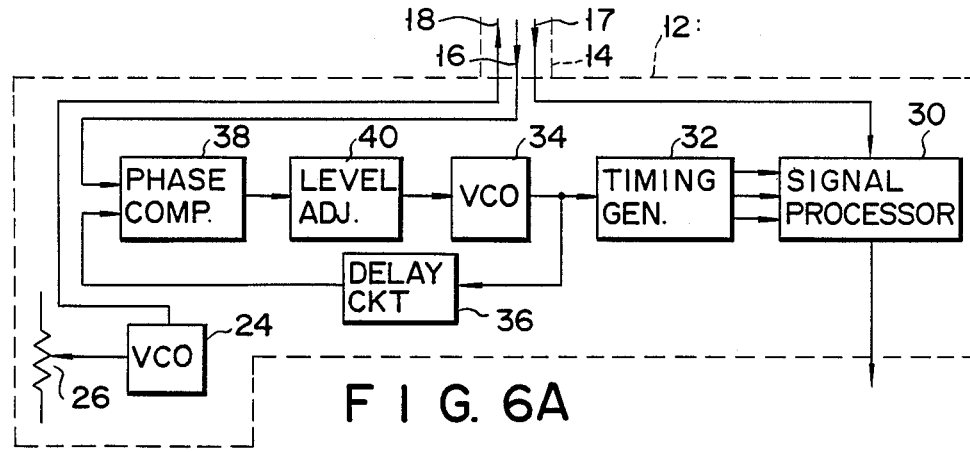
FIGS. 6A, 6B, and 6C are block diagrams showing modifications of the third embodiment.
Figure 6B:
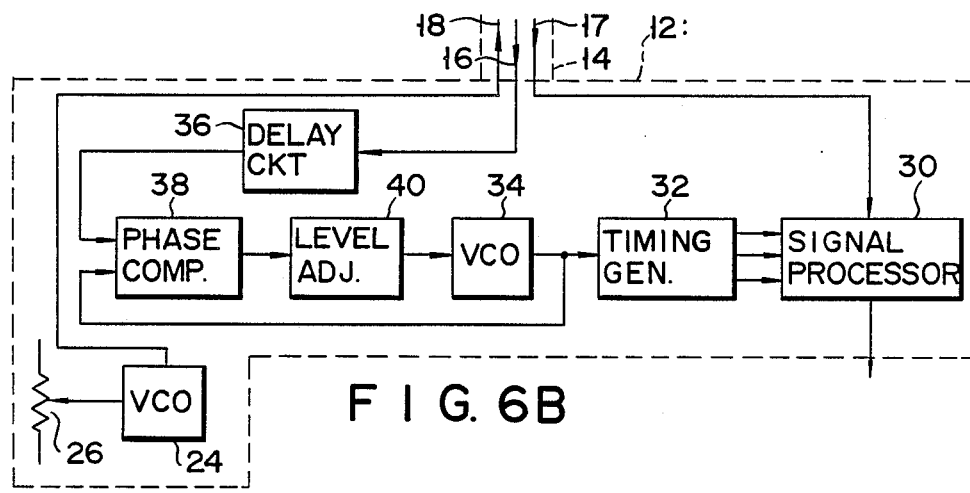
Figure 6C:
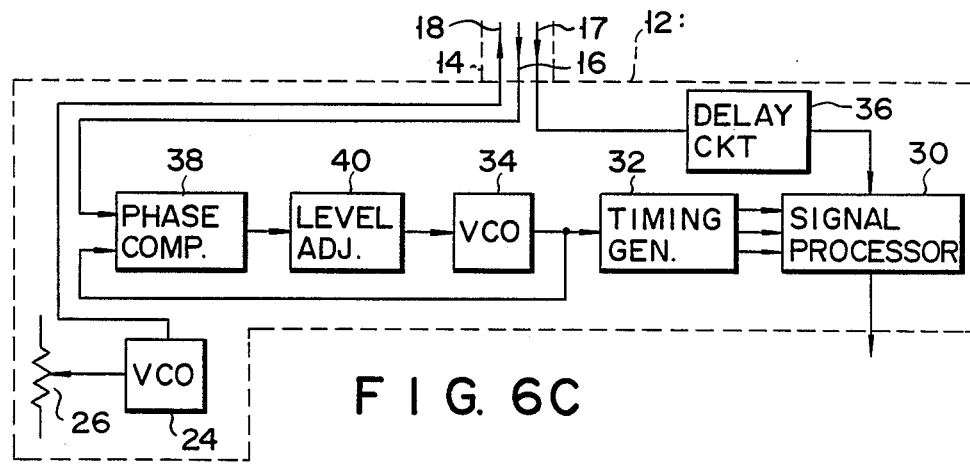

The position of connection of delay circuit 36 is not limited to the output side of VCO 34, and it is possible to select various positions for connection. FIGS. 6A to 6C show modifications of the third embodiment. In the modification of FIG. 6A, the output of VCO 34 is directly supplied to timing generator 32, and delay circuit 36 is inserted in a feedback line from the output of VCO 34 to phase comparator 38. In the modification of FIG. 6B, the output of VCO 24, which is an input to drive pulse generator 22 and is returned from camera head 10 through signal line 16, is supplied through delay circuit 36 to phase comparator 38. In the modification of FIG. 6C, the output signal of CCD 20, supplied through signal line 17, is supplied through delay circuit 36 to signal processor 30. With the modifications of FIGS. 6A to 6C, the same effects as in the third embodiment can be obtained.

Now, a fourth embodiment of the video camera device according to the invention will be described. FIG. 7 is a block diagram showing the fourth embodiment. In this embodiment, first VCO 24 is provided in camera head 10 like the first embodiment. Phase comparator 38 detects the phase difference between equal frequency pulse signals in timing pulse outputs of timing generator 32 and drive pulse outputs of drive pulse generator 22 instead of the phase difference between the inputs to timing generator 32 and drive pulse generator 22. More specifically, the output of drive pulse generator 22 having a predetermined frequency is transmitted through signal line 16 to signal processing circuit 12 to be supplied to the first input terminal of phase comparator 38. The output signal of timing generator 32 having the same predetermined frequency is supplied to the second input terminal of phase comparator 38.

Even in this fourth embodiment, the timing pulse signal output from timing generator 32 coincides in phase with the output signal of CCD 20 having been transmitted from camera head 10 through signal line 17 to signal processor 30, and the output signal of CCD 20 is processed at accurate timing.

Further, in the fourth embodiment a drive pulse signal obtained through frequency division is transmitted instead of the output of VCO 24 from camera head 10 through signal line 16 to signal processing circuit 12, so that it is possible to obtain phase coincidence after the frequency division. Further, the drive pulse signal is lower in frequency than the output of VCO 24, so that waveform deterioration during transmission is less liable to result.

FIGS. 8A to 8C show modifications of the fourth embodiment concerning the position of connection of delay circuit 36. In the modification of FIG. 8A, the output of timing generator 32 is supplied through delay circuit 36 to phase comparator 38. In the modification of FIG. 8B, the output of drive pulse generator 22, supplied from camera head 10 through signal line 16, is supplied through delay circuit 36 to phase comparator 38. In the modification of FIG. 8C, the output of CCD 20 is, supplied through signal line 17, supplied through delay circuit 36 to signal processor 30. With these modifications, the same effects as in the fourth embodiment can be obtained.

As has been described in the foregoing, in the third and fourth embodiments the transmission delay of signal from the camera head to the signal processing circuit is detected by the phase comparator therein, and the timing of the signal processor for processing the output signal of the solid-state image sensor device is controlled by the output of the phase comparator, and it is possible to provide a video camera device with the separate camera head and signal processing circuit having a simple construction, which can compensate for the delay in the signal transmission along the cable between the camera head and signal processing circuit. Further, with the video camera device the drive pulse of the solid-state image sensor device is not transmitted from the signal processing circuit but is generated in the camera head. Therefore, there is no need of providing in the signal processing circuit any matching circuit for pre-compensating for the deterioration of the waveform during transmission of the drive pulse, and the construction of the signal processing circuit is simplified.

FIG. 9 is a block diagram showing a fifth embodiment of the invention. In this embodiment, camera head 10 comprises CCD 10. Drive pulse generator 22, first VCO 24 and potentiometer 26 are provided in signal processing circuit 12. The outputs of pulse generator 22 are supplied through signal line 18 in cable 16 to CCD 20. Further, in this embodiment holded-back line 16 with a holded-back end in camera head 10 is provided in cable 14, and the output of VCO 24 is transmitted to camera head 10 and returned to signal processing circuit 12 through holded-back line 16. The returned signal is supplied to one input terminal of phase comparator 38. The output of VCO 34 is supplied to the other input terminal of phase comparator 38 through delay circuit 36.

In this fifth embodiment, the phase difference between the output of first VCO 24 in signal processing circuit 12 transmitted to and returned from camera head 10 through holded-back signal line 16 and output of delay circuit 36 (i.e., input to timing generator 32) is detected by the phase comparator 38. With this arrangement, the phase delay until the output of CCD 20 is transmitted to the signal processor 30 through signal line 17 is detected by phase comparator 38.

For this reason, the timing pulse output from timing generator 32 coincides in phase with the output signal of CCD 20 having been transmitted from camera head 10 to signal processor 30 through signal line 17, and the output signal of CCD 20 is processed at accurate timing. Further, even when the delay time during the signal transmission is changed with a change in the length of cable 14 of endoscope as noted above, the same construction of PLL circuit may be used in signal processing circuit 12, and no adjustment is needed.

The position of connection of delay circuit 36 is not limited to the output side of VCO 34, and it is possible to select various desired positions. FIGS. 10A to 10C show modifications. In the modification of FIG. 10A, the output of VCO 24 is transmitted to and returned from camera head 10 through holded-back signal line 16, and it is also supplied to phase comparator 38 through delay circuit 36. In the modification of FIG. 10B, the output of VCO 34 is directly supplied to timing generator 32, and delay circuit 36 is inserted in a feedback line from the output of VCO 34 to phase comparator 38. In the modification of FIG. 10C, the output signal of CCD 20, supplied through signal line 17, is supplied to signal processor 30 through delay circuit 36. With the modifications of FIGS. 10A to 10C the same effects as in the fifth embodiment can be obtained.

Figure 11:
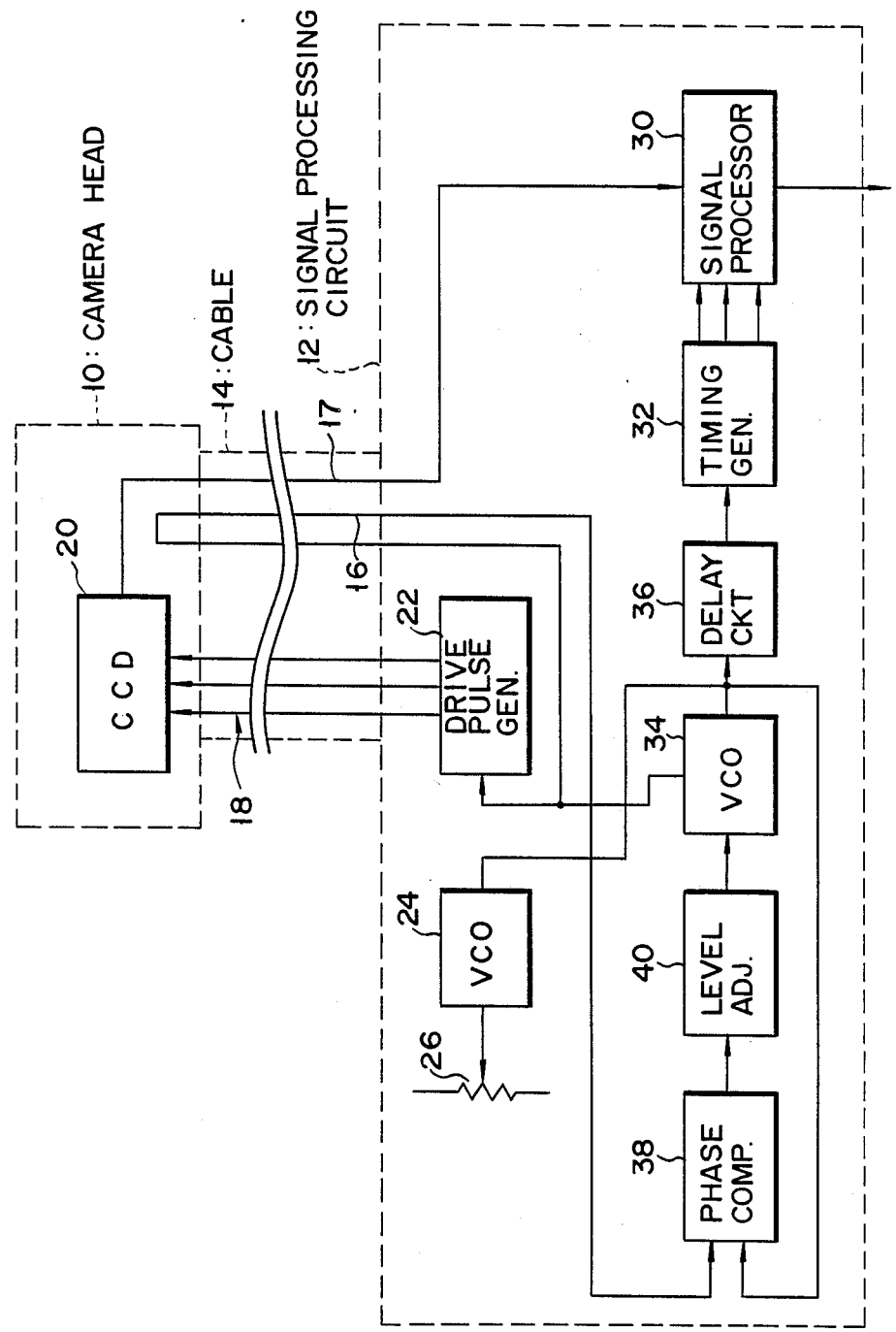
FIG. 11 is a block diagram showing a sixth embodiment of the video camera device according to the invention.

FIG. 11 is a block diagram showing a sixth embodiment of the invention. In this embodiment, drive pulse generator 22 uses the output of second VCO 34 as reference clock signal. Phase comparator 38 detects the phase difference between the output of first VCO 24 and the output of VCO 34 which is transmitted to and returned from camera head 10 through holded-back signal line 16. The oscillation frequency of VCO 34 is controlled by the output of phase comparator 38. In all the previous embodiments the phase of the timing pulse of signal processor 30 output from timing generator 32 is controlled by the PLL, but in the sixth embodiment the phase of the drive pulse signal generated based on output of VCO 34 is controlled by the output of phase comparator 38.

In the six embodiment the timing pulse signal from timing generator 32 coincides in phase with the output signal of CCD 20 having been transmitted from camera head 10 to signal processing circuit 30 through signal line 17.

FIGS. 12A to 12D show modifications of the sixth embodiment concerning the position of connection of delay circuit 36. In the modification of FIG. 12A, the output of VCO 34 is transmitted to and returned from camera head 10 through holded-back signal line 16, and it is supplied to phase comparator 38 through delay circuit 36. In the modification of FIG. 12B, the output of VCO 24 is supplied through delay circuit 36 to phase comparator 38. In the modification of FIG. 12C, the output of VCO 34 is supplied through delay circuit 36 to drive pulse generator 22, and the output of delay circuit 36 is transmitted to and returned from camera head 10 through holded-back signal line 16, and further supplied to phase comparator 38. In the modification of FIG. 12D, the output of CCD 20, supplied through signal line 17, is supplied through delay circuit 36 to signal processor 30. With these modifications the same effects as in the sixth embodiment can be obtained.

Figure 13:
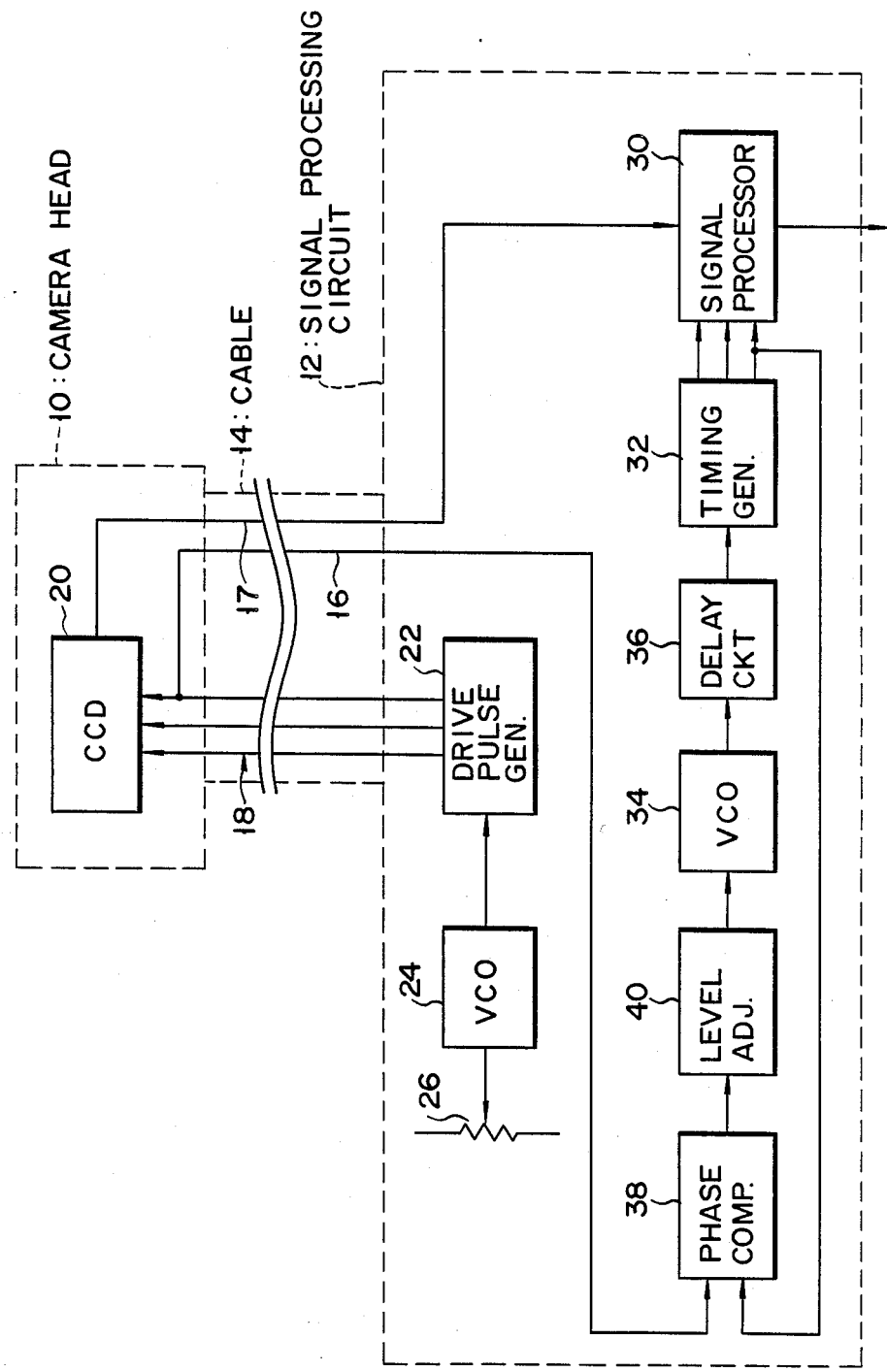
FIG. 13 is a block diagram showing a seventh embodiment of the video camera device according to the invention.

FIG. 13 is a block diagram showing a seventh embodiment. In this embodiment, unlike the fifth embodiment, phase comparator 38 detects the phase difference between drive pulse and timing pulse. More specifically, the outputs of drive pulse generator 22 in signal processing circuit 12 are transmitted through signal line 18 in cable 14 to CCD 20 in camera head 10. The drive pulse signal having a predetermined frequency is also transmitted through signal line 16 back to signal processing circuit 12 and is supplied to a first input terminal of phase comparator 38. The timing pulse having the same predetermined frequency is supplied to a second input terminal of phase comparator 38.

With such seven embodiment, the timing pulse signal output from timing generator 32 coincides in phase with the output signal of CCD 20 having been transmitted from camera head 10 through signal line 17 in cable 14 to signal processor 30, and the output signal of CCD 20 is processed at accurate timing. Further, in this embodiment it is not the output of VCO 24 but a drive pulse signal obtained through frequency division of that output that is transmitted from camera head 10 back to signal processing circuit 12, so that it is possible to obtain phase coincidence after the frequency division.

FIGS. 14A to 14C show modifications of the seventh embodiment concerning the position of connection of delay circuit 36. In the modification of FIG. 14A, the drive pulse signal transmitted to camera head 10 through signal line 18 and transmitted back from camera head 10 through signal line 16 is supplied through delay circuit 36 to phase comparator 38. In the modification of FIG. 14B, delay circuit 36 is connected in a feedback line from the output of timing generator 32 to phase comparator 38. In the modification of FIG. 14C, the output signal of CCD 20, supplied through signal line 17, is supplied through delay circuit 36 to signal processor 30. With these modifications the same effects as in the seventh embodiment can be obtained.

FIG. 15 is a block diagram of an eighth embodiment of the invention. In this embodiment, unlike the sixth embodiment, phase comparator 38 detects the phase difference between the drive pulse and timing pulse. In other words, the output of drive pulse generator 22 is transmitted through signal line 18 in cable 14 to CCD 10 in camera head 10. The drive pulse signal having a predetermined frequency is transmitted through signal line 16 back to signal processing circuit 12 and is supplied through delay circuit 36 to a first input terminal of phase comparator 38. The timing pulse signal output of timing generator 32 having the same predetermined frequency is supplied to a second input terminal of phase comparator 38. The output of phase comparator 38 controls the phase of the drive pulse signal through the oscillation frequency of VCO 34.

In this eighth embodiment the timing pulse signal output from timing generator 32 coincides in phase with the output signal of CCD 20 having been transmitted from camera head 10 through signal line 17 to signal processor 30, and the output signal of CCD 20 is processed at accurate timing. Further, with the eighth embodiment, like the seventh embodiment, coincidence of phase of frequency division can be obtained.

FIGS. 16A to 16C show modifications of the eighth embodiment concerning the position of connection of delay circuit 36. In the modification of FIG. 16A, delay circuit 36 is connected in a feedback line from the output of timing generator 32 to phase comparator 38. In the modification of FIG. 16B, the output of VCO 34 is supplied through delay circuit 36 to drive pulse generator 22. In the modification of FIG. 16C, the output signal of CCD 20, supplied through signal line 17, is supplied through delay circuit 36 to signal processor 30. Further, with these embodiments the same effects as in the eighth embodiment can be obtained.

As has been shown in the foregoing, the transmission delay of signal from camera head to signal processing circuit is detected by the phase comparator in the signal processing circuit, and the timing of the signal processor for processing the output of the solid-state image sensor device is controlled by the output of the phase comparator, thus providing a camera video device, which has a simple construction of compensating for the delay of signal transmission through the cable between the camera head and signal processing circuit.

The embodiments described above are by no means limitative. For example, the solid-state image sensor device may consist of other devices than the CCD. The video camera device is not limited to the endoscope, but it may be a video camera device in which the camera head and the signal processing circuit are provided as separate components and connected to each other through the signal line, for example, a general industrial examination camera for a narrow portion of object. Further, the phase control means may be of other systems than the PLL system.

What is claimed is:

1. A video camera device comprising:
   a camera head including image sensing means and first pulse generation means for generating a first pulse signal for driving said image sensing means; and
   a signal processing circuit connected to said camera head through a signal line for processing a signal supplied from said image sensing means through the signal line;
   said signal processing circuit comprising:
   second pulse generating means for generating a second pulse signal for signal processing; and phase controlling means for detecting a phase difference between the first pulse signal supplied from said camera head through the signal line and the second pulse signal and for controlling a phase of at least one of said first and second pulse signals according to the output of said phase detecting means to thereby make the phases of said first and second pulse signals coincident at the time of signal processing.

2. The video camera device according to claim 1, wherein said image sensing means comprises a solid-state image sensor device,
said first pulse generating means comprises a first oscillator and a pulse generator for frequency dividing the output of said first oscillator to produce the first pulse signal,
said second pulse generating means comprises a second oscillator and a timing generator for frequency dividing the output of said second oscillator to produce the second pulse signal, and
said phase control means comprises signal transmitting means for transmitting the output of said first oscillator to said signal processing circuit and a phase comparator for detecting a phase difference between the input to said timing generator and the output of said first oscillator which is transmitted from said camera head through said signal transmitting means to thereby control a phase of said second oscillator according to the phase difference.

3. The video camera device according to claim 2, wherein a delay circuit is connected between an output terminal of said first oscillator and an input terminal of said phase comparator.

4. The video camera device according to claim2, wherein a delay circuit is connected between an output terminal of said second oscillator and an input terminal of said phase comparator.

5. The video camera device according to claim 2, wherein a delay circuit, for delaying an output signal from said camera head, is connected between said camera head and said signal processing circuit.

6. The video camera device according to claim 1, wherein said first pulse generating means comprises a first oscillator and a pulse generator for frequency dividing the output of said first oscillator to produce the first pulse signal,
said second pulse generating means comprises a second oscillator and a timing generator for frequency dividing the output of said second oscillator to generate the second pulse signal, and
said phase control means comprises signal transmitting means for transmitting said first pulse signal to said signal processing circuit and a phase comparator for detecting a phase difference between said first pulse signal and second pulse signal which is transmitted from said camera head through said signal transmitting means to thereby control a phase of said second oscillator according to the phase difference.

7. The video camera device according to claim 6, wherein a delay circuit is connected between an output terminal of said first oscillator and an input terminal of said phase comparator.

8. The video camera device according to claim 6, wherein a delay circuit is connected between an output terminal of said second oscillator and an input terminal of said phase comparator.

9. The video camera device according to claim 6, wherein a delay circuit, for delaying an output signal from said image sensing means, is connected between said image sensing means and said signal processing circuit.

10. The video camera device according to claim 1, wherein said image sensor means includes a solid-state image sensor device, and said signal processing circuit includes first and second oscillators for generating reference pulses of said first and second pulse signals.

11. The video camera device according to claim 10, wherein said first pulse generating means comprises a pulse generator for frequency dividing the output of said first oscillator to generate the first pulse,
said second pulse generating means comprises a timing generator for frequency dividing the output of said second oscillator to generate the second pulse signal, and
said phase control means comprises signal transmitting means for transmitting the input to said pulse generator back to said signal processing circuit and a phase comparator for detecting a phase difference between the input to said timing generator and the input to said pulse generator which is transmitted back from said camera head through said signal transmitting means to thereby control a phase of said second oscillator according to the phase difference.

12. The video camera device according to claim 11, wherein a delay circuit is connected between an output terminal of said first oscillator and an input terminal of said phase comparator.

13. The video camera device according to claim 11, wherein a delay circuit is connected between an output terminal of said second oscillator and an input terminal of said phase comparator.

14. The video camera device according to claim 11, wherein a delay circuit, for delaying an output signal from said image sensing means, is connected between said image sensing means and said signal processing circuit.

15. The video camera device according to claim 10, wherein said first pulse generating means comprises a pulse generator for frequency dividing the output of said first oscillator to produce the first pulse signal,
said second timing pulse generating means comprises a timing generator for frequency dividing the output of said second oscillator to generate the second pulse signal, and
said phase control means comprises signal transmitting means for transmitting said first pulse signal to said signal processing circuit and a phase comparator for detecting a phase difference between said second pulse signal and said first pulse signal which is transmitted from said camera head through said signal transmitting means to thereby control a phase of said second oscillator according to the phase difference.

16. The video camera device according to claim 15, wherein a delay circuit is connected between an output terminal of said first oscillator and an input terminal of said phase comparator.

17. The video camera device according to claim 15, wherein a delay circuit is connected between an output terminal of said second oscillator and an input terminal of said phase comparator.

18. The video camera device according to claim 15, wherein a delay circuit, for delaying an output signal from said image sensing means, is connected between said image sensing means and said signal processing circuit.

19. A video camera device comprising:
a camera head including image sensor means; and
a signal processing circuit, connected to said camera head through a signal line, for processing signal supplied from said camera head through the signal line;
said signal processing circuit comprising:
first pulse generating means for generating a first pulse signal for driving said image sensor means;
second pulse generating means for generating a second pulse signal for signal processing in said signal processing circuit;
holded-back signal line means for transmitting either one of said first and second pulse signals to said camera head for returning the signal to said signal processing circuit; and
phase control means for detecting a phase difference between said one of said first and second pulse signals returned through said holded-back signal line means and the other of said first and second pulse signals and for controlling a phase of at least one of said first and second pulse signals according to the phase difference to make the first and second pulse signals coincident in phase at the time of signal processing.

20. The video camera device according to claim 19, wherein said first pulse generating means comprises a first oscillator and a pulse generator for frequency dividing the output of said first oscillator to produce the first pulse signal,
said second pulse generating means comprises a second oscillator and a timing generator for frequency dividing the output of said second oscillator to produce the second pulse signal,
said holded-back signal line means comprises means for transmitting the output of said first oscillator to said camera head and for returning the signal from said camera head to said signal processing circuit, and
said phase control means comprises a phase comparator for detecting a phase difference between the input to said timing generator and the output of said first oscillator which is returned from said camera head to thereby control a phase of said second oscillator according to the phase difference.

21. The video camera device according to claim 20, wherein a delay circuit is connected between an output terminal of said first oscillator and an input terminal of said phase comparator.

22. The video camera device according to claim 20, wherein a delay circuit is connected between an output terminal of said second oscillator and an input terminal of said phase comparator.

23. The video camera device according to claim 20, wherein a delay circuit, for delaying an output signal from said image sensing means, is connected between said image sensing means and said signal processing circuit.

24. The video camera device according to claim 19, wherein said first pulse generating means comprises a first oscillator and a pulse generator for frequency dividing the output of said first oscillator to produce the first pulse signal,
said second pulse generating means comprises a second oscillator and a timing generator for frequency dividing the output of said second oscillator to produce the second pulse signal,
said holded-back signal line means comprises means for returning the first pulse signal having been transmitted to said camera head back to said signal processing circuit, and
said phase control means comprises a phase comparator for detecting a phase difference between said second pulse signal and the first pulse signal returned back from said camera head to thereby control a phase of said second oscillator according to the phase difference.

25. The video camera device according to claim 24, wherein a delay circuit is connected between an output terminal of said first oscillator and an input terminal of said phase comparator.

26. The video camera device according to claim 24, wherein a delay circuit is connected between an output terminal of said second oscillator and an input terminal of said phase comparator.

27. The video camera device according to claim 24, wherein a delay circuit, for delaying an output signal from said image sensing means, is connected between said image sensing means and said signal processing circuit.

28. The video camera device according to claim 19, wherein said first pulse generating means comprises a first oscillator and a pulse generator for frequency dividing the output of said first oscillator to generate the first pulse signal,
said second pulse generating means comprises a second oscillator and a timing generator for frequency dividing the output of said second oscillator to produce the second pulse signal,
said holded-back signal line means comprises means for transmitting the output of said first oscillator to said camera head and for returning the signal from said camera head to said signal processing circuit, and
said phase control means comprises a phase comparator for detecting a phase difference between the input to said timing generator and the output of said first oscillator returned back from said camera head to thereby control a phase of said first oscillator according to the phase difference.

29. The video camera device according to claim 28, wherein a delay circuit is connected between an output terminal of said first oscillator and an input terminal of said phase comparator.

30. The video camera device according to claim 28, wherein a delay circuit is connected between an output terminal of said second oscillator and an input terminal of said phase comparator.

31. The video camera device according to claim 28, wherein a delay circuit, for delaying an output signal from said image sensing means, is connected between said image sensing means and said signal processing circuit.

32. The video camera device according to claim 19, wherein said first pulse generating means comprises a first oscillator and a pulse generator for frequency dividing the output of said first oscillator to produce the first pulse signal,
said second pulse generating means comprises a second oscillator and a timing generator for frequency dividing the output of said second oscillator to produce the second pulse signal, said holded-back signal line means comprises means for returning the first pulse signal having been transmitted to said camera head back to said signal processing circuit, and said phase control means comprises a phase comparator for detecting a phase difference between said second pulse signal and the first pulse signal returned back from said camera head to thereby control a phase of said first oscillator according to the phase difference.

33. The video camera device according to claim 32, wherein a delay circuit is connected between an output terminal of said first oscillator and an input terminal of said phase comparator.

34. The video camera device according to claim 32, wherein a delay circuit is connected between an output terminal of said second oscillator and an input terminal of said phase comparator.

35. The video camera device according to claim 32, wherein a delay circuit, for delaying an output signal from said image sensing means, is connected between said image sensing means and said signal processing circuit.

* * * * *